United States Patent Office 3,511,756
Patented May 12, 1970

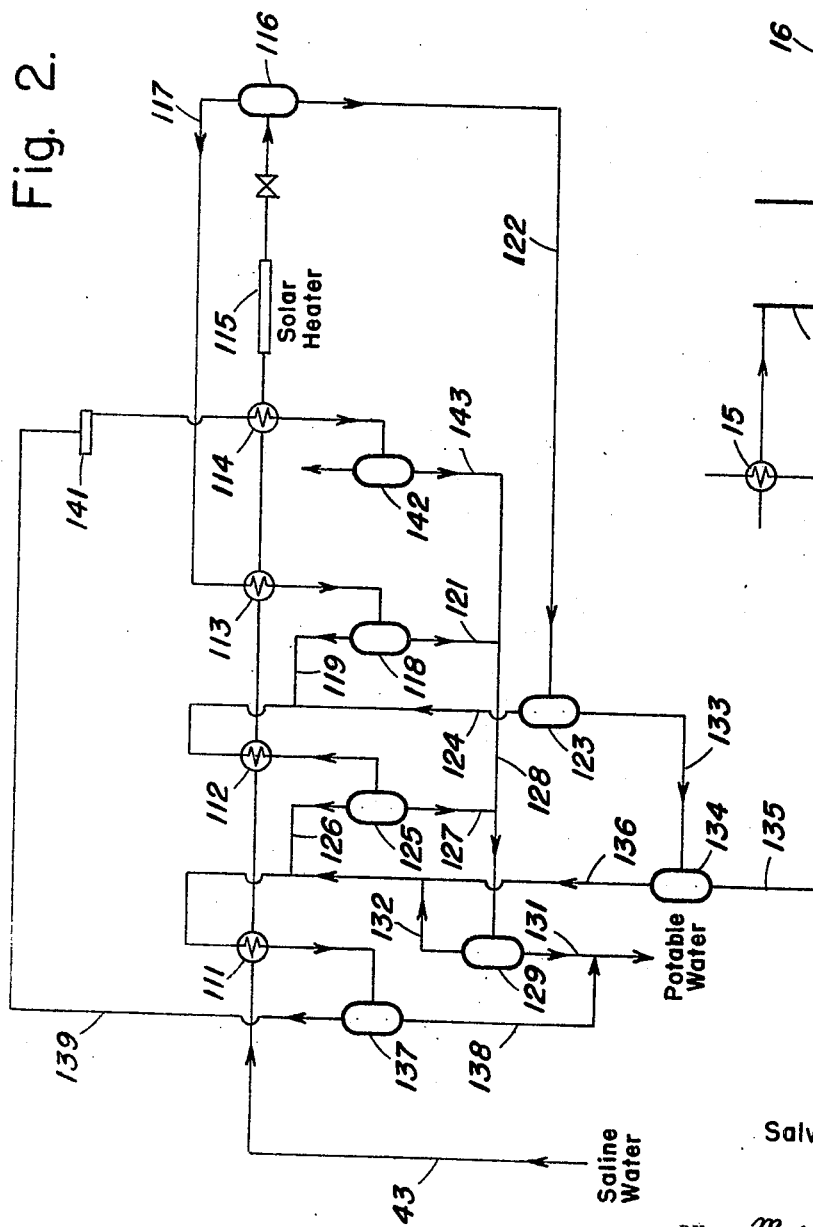
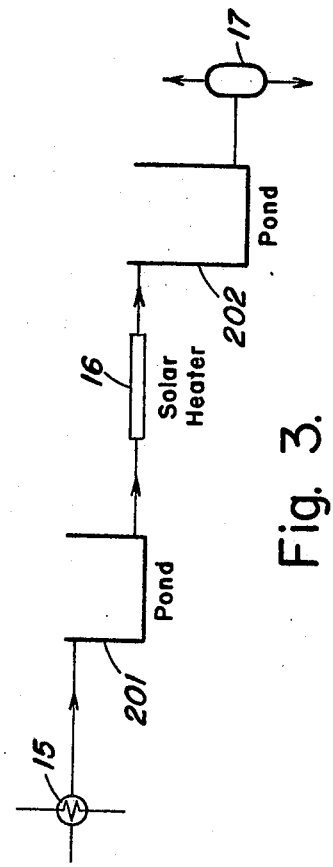
Fig. 2.
Fig. 3.
INVENTOR.
Salvatore A. Guerrieri

3,511,756
FLASH EVAPORATION WITH SERIES ARRANGED WITH SOLAR HEATING ZONE
Salvatore A. Guerrieri, Rowayton, Conn. (% The Lummus Company, 385 Madison Ave., New York, N.Y. 10017)
Filed Mar. 13, 1967, Ser. No. 622,622
Int. Cl. B01d 3/06; C02b 1/06
U.S. Cl. 203—11     5 Claims

ABSTRACT OF THE DISCLOSURE

A process and apparatus for producing potable water from saline water wherein the saline water is heated in a solar heater without change of phase and then flashed in a plurality of below atmospheric pressure stages of decreasing temperature and pressure. The flashed vapors are condensed and recovered as potable water. The saline water recovered from the last stage may be heated in a solar heater without change of phase and flashed in another plurality of below atmospheric pressure stages of decreasing temperature and pressure, containing one less stage than the first plurality of stages. The system may be adapted to around the clock operation by passing a full day water requirements through the solar heater during the sunny hours and storing a portion thereof as feed for the flash stages during non-sunny hours.

---

This invention relates to the evaporation of liquids and is particularly directed to the production of potable water from brackish water and brines.

Recently, there have been many processes directed to the production of potable water from brackish water and brines, hereinafter generically referred to as "saline water," and in particular, to the use of solar heat to recover potable water from saline water. To date, the processes employing solar heat are based on a humidification-dehumidification operation wherein saline water flows through basins, provided with a translucent membrane cover, and is heated therein by solar radiation. An air space is provided between the surface of the water and the membrane and the air flowing therethrough, in contact with the warm water, is humidified. The humidified air is passed to a second zone wherein the air contacts a cooler membrane to condense water therefrom. The second zone is provided with suitable collecting troughs and channels to collect and pass the water to storage.

The above described system is not suitable for low cost design because of the problems in designing the membrane and dehumidifier and the lack of a suitable method for recovering latent heat. In regard to the latter, it has been estimated that approximately one thousand B.t.u. of solar heat must be supplied to vaporize one pound of water; and at a latitude of 35° north, where solar radiation incident on one square foot is about 360 B.t.u. per hour, about three square feet of surface are required to evaporate one pound of water per hour, operating at 100% efficiency. It should be readily apparent that in allowing for inefficiencies and lower incident solar energy at other hours, the evaporation area will have to be increased considerably.

An object of this invention is to provide an improved process and apparatus for evaporating liquids.

Another object of this invention is to provide an improved process and apparatus for using solar heat in evaporating liquids.

A further object of this invention is to provide a process and apparatus for producing potable water by the use of solar heat.

These and other objects will become clear from the following detailed description of the invention when read with reference to the accompanying drawings wherein:

FIG. 2 is a simplified schematic flow diagram of another embodiment of the invention; and FIG. 3 is a simplified schematic partial flow diagram of a modification of the embodiment of FIG. 1.

Figure 1:
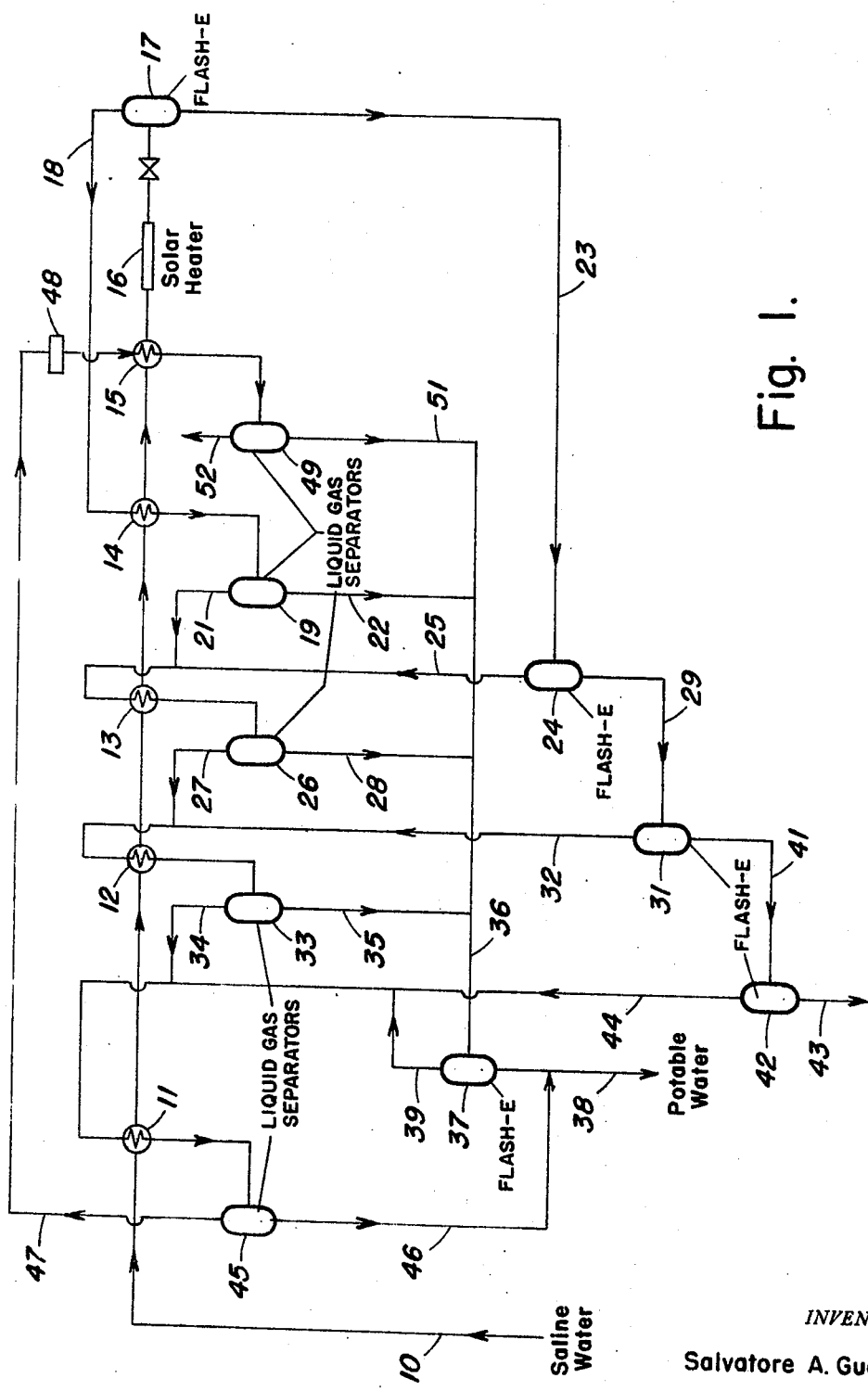
FIG. 1 is a simplified schematic flow diagram of an embodiment of the invention.

The objects of this invention are broadly accomplished by heating a liquid with solar energy, without change of phase, followed by flashing the heated liquid to effect evaporation. More particularly, the liquid which has been heated by solar energy without change of phase, is passed through a series of below atmospheric pressure flash evaporation stages of decreasing temperature, with the liquid vapors from each stage being condensed and recovered. In a distinct embodiment of the invention, the unvaporized liquid recovered from the last flash vaporization stage is reheated by solar energy and again passed through a series of below atmospheric pressure flash evaporation stages with the second series of flash evaporization stages containing less stages than the first series.

The invention will be described in more detail with reference to the purification of saline water, but it is to be understood that the invention is equally applicable to the evaporation of liquids other than saline water. The specific equipment to be employed is schematically illustrated and equipments such as valves, pumps, and the like are not shown to simplify the description of the invention. The choice of specific equipment in appropriate places should be readily apparent to those skilled in the art from the teachings of the invention. Thus, the solar heater employed could be any one of a wide variety of solar heaters known in the art, e.g., a solar heater having a covering membrane which is both highly translucent to incident solar radiation and substantially opaque to low temperature radiation from the pool of water being heated therein. The membrane should also have a low thermal conductivity to minimize both conductive and convective heat losses. A covering membrane comprised of a plurality of adjacent membranes separated by a small air space is especially effective in minimizing heat losses.

Referring to FIG. 1, saline water in line 10 is successively passed through heat exchangers 11, 12, 13 and 14 wherein the saline water is heated to successively higher temperatures by indirect heat transfer with vapors withdrawn from a plurality of flash evaporators, as hereinafter more fully described. The now heated water is passed through another heat exchanger 15, and further heated therein by indirect heat transfer with non-condensible gases being passed to a vent, as hereinafter more fully described. The heated water from heat exchanger 15 is then passed through a solar heater, schematically indicated at 16, and heated therein, without change of phase, by solar radiation.

The heated water withdrawn from solar heater 16 is introduced into a flash evaporator 17 operating at a pressure below atmospheric pressure to effect partial vaporization thereof. Flashed vapor, including water vapor and non-condensible gases contained in the saline water, is withdrawn from flash evaporator 17 through line 18 and passed through the heat exchanger 14 in an indirect heat transfer relationship with the saline water feed flowing therethrough. As a result of the indirect heat transfer between the saline water and flashed vapor in heat exchanger 14, a portion of the water vapor contained in the flashed vapor is condensed. The condensate and water saturated non-condensible gases are passed to a separator 19 to recover condensate. The water saturated non-condensible gas is withdrawn from separator 19 through line 21 for combination with vapors withdrawn from the next lower flash evaporator. Condensate is withdrawn from the separator 19 through line 22 for further treatment, as hereinafter more fully described.

Unvaporized saline water is withdrawn from flash evaporator 17 through line 23 and introduced into a flash evaporator 24, operating at a temperature lower than flash evaporator 17, to effect further vaporization thereof. Flashed vapor is withdrawn from the flash evaporator 24 through line 25, combined with the water saturated non-condensible gas in line 21 and passed through heat exchanger 13 wherein a portion of the water vapor is condensed by indirect heat transfer with the saline water feed flowing therethrough. Condensate and water saturated non-condensible gas withdrawn from heat exchanger 13 are introduced into a separator 26 to recover condensate therefrom. The water saturated non-condensible gas is withdrawn from the separator 26 through line 27 for combination with vapors withdrawn from the next lower flash evaporator. Condensate is withdrawn from the separator 26 through line 28 for further treatment, as hereinafter more fully described.

Unvaporized saline water is withdrawn from flash evaporator 24 through line 29 and introduced into a flash evaporator 31, operating at a temperature lower than flash evaporator 24, to effect further vaporization thereof. Flashed vapor is withdrawn from the flash evaporator 31 through line 32, combined with the water saturated non-condensible gas in line 27 and passed through heat exchanger 12 wherein a portion of the water vapor is condensed by indirect heat transfer with the saline water feed flowing therethrough. Condensate and water saturated non-condensible gas withdrawn from heat exchanger 12 are introduced into a separator 33 to recover condensate therefrom. The water saturated non-condensible gas is withdrawn from the separator 33 through line 34 for combination with vapors withdrawn from the next lower flash evaporator. Condensate is withdrawn from the separator 33 through line 35 for further treatment, as hereinafter more fully described.

The condensate in lines 22, 28 and 35 are combined in line 36 and introduced into a flash evaporator 37 to effect flash cooling thereof. The unvaporized condensate is withdrawn from the flash evaporator 37 through line 38 and passed to storage (not shown). Flashed vapors are withdrawn from the flash evaporator 37 through line 39 for combination with the flashed vapors withdrawn from the last saline water flash evaporator, as hereinafter more fully described.

Unvaporized saline water is withdrawn from the flash evaporator 31 through line 41 and introduced into a flash evaporator 42, operating at a temperature lower than flash evaporator 31, to effect further vaporization thereof. Unvaporized saline water is withdrawn from the flash evaporator 42 through line 43 for rejection or further treatment in accordance with a second embodiment of the invention. Flashed vapor is withdrawn from the flash evaporator 42 through line 44, combined with the water vapor in line 39 and the water saturated non-condensible gas in line 34. The combined stream in line 44 is passed through heat exchanger 11 wherein a portion of the water vapor is condensed by indirect heat transfer with the saline water feed flowing therethrough. Condensate and water saturated non-condensible gas withdrawn from heat exchanger 11 are introduced into a separator 45 to recover condensate. The condensate is withdrawn from separator 45 through line 46 and combined with the condensate in line 38 being passed to storage (not shown).

Water saturated non-condensible gas is withdrawn from separator 45 through line 47, compressed to about atmospheric pressure by compressor 48 and passed through heat exchanger 15 wherein the water is condensed at the higher pressure by indirect heat transfer with the saline water feed flowing therethrough. The condensate and non-condensible gas is introduced into a separator 49 to recover condensate.

The condensate is withdrawn from separator 49 through line 51 and combined with the condensate in line 36, for cooling and passage to storage, as hereinabove more fully described. The non-condensible gases are vented from the separator 49 through line 52.

In accordance with a second embodiment of the invention, the brine withdrawn from the last flash evaporator 42 through line 43, is treated in a manner similar to the one described hereinabove, using one less flash evaporator. Referring to FIG. 2, unvaporized saline water withdrawn from flash evaporator 42 through line 43 is successively passed through heat exchangers 111, 112 and 113 to effect heating thereof by indirect heat transfer with vapors withdrawn from a plurality of flash evaporators, as hereinafter more fully described. The now heated water is passed through another heat exchanger 114, and further heated therein by indirect heat transfer with non-condensible gases being passed to a vent, as hereinafter more fully described. The heated water withdrawn from the heat exchanger 114 is then passed through a solar heater, schematically indicated as 115, and heated therein, without change of phase, by solar radiation.

Heated water withdrawn from solar heater 115 is introduced into a flash evaporator 116, operating at a pressure below atmospheric pressure, to effect partial vaporization thereof. Flashed vapor including water vapor and non-condensible gases, is withdrawn from flash evaporator 116 through line 117 and passed through heat exchanger 113 wherein a portion of the water vapor is condensed by indirect heat transfer with the saline water feed flowing therethrough. Condensate and water saturated non-condensible gases withdrawn from heat exchanger 113 are introduced into a separator 118 to recover condensate therefrom. The water saturated non-condensible gas is withdrawn from separator 118 through line 119 for combination with vapors withdrawn from the next lower flash evaporator. Condensate is withdrawn from the separator 118 through line 121 for further treatment, as hereinafter more fully described.

Unvaporized saline water is withdrawn from flash evaporator 116 through line 122 and introduced into a flash evaporator 123, operating at a temperature lower than flash evaporator 116, to effect further vaporization thereof. Flashed vapor is withdrawn from the flash evaporator 123 through line 124, combined with the water saturated non-condensible gas in line 119 and passed through heat exchanger 112 wherein a portion of the water vapor is condensed by indirect heat transfer with the saline water feed flowing therethrough. Condensate and water saturated non-condensible gas withdrawn from heat exchanger 112 are introduced into a separator 125 to recover condensate therefrom. The water saturated non-condensible gas is withdrawn from the separator 125 through line 126 for combination with vapors withdrawn from the next lower flash evaporator. Condensate is withdrawn from the separator 125 through line 127 for further treatment, as hereinafter more fully described.

The condensate in lines 121 and 127 is combined in line 128 and introduced into a flash evaporator 129 to effect flash cooling thereof. Unvaporized condensate is withdrawn from the flash evaporator 129 through line 131 and passed to storage (not shown). Flashed vapors are withdrawn from the flash evaporator 129 through line 132 for combination with the flashed vapors withdrawn from the last saline water flash evaporator as hereinafter more fully described.

Unvaporized saline water is withdrawn from flash evaporator 123 through line 133 and introduced into a flash evaporator 134, operating at a temperature lower than flash evaporator 123, to effect further vaporization thereof. Unvaporized saline water is withdrawn from flash evaporator 134 through line 135 for rejection or further treatment in accordance with a distinct embodiment of the invention. Flashed vapor is withdrawn from the flash evaporator 134 through line 136 and combined with the water vapor in line 132 and the water saturated non-condensible gas in line 126. The combined stream in line 136 is passed through heat exchanger 111 wherein a portion of the water vapor is condensed by indirect heat transfer with the saline water feed flowing therethrough. Condensate and water saturated non-condensible gas withdrawn from heat exchanger 111 are introduced into a separator 137 to recover condensate therefrom. The condensate is withdrawn from separator 137 through line 138 and combined with the condensate in line 131 being passed to storage (not shown).

Water saturated non-condensible gas is withdrawn from separator 137 through line 139, compressed to about atmospheric pressure by compressor 141 and passed through heat exchanger 114 wherein the water vapor is condensed at the higher pressure by indirect heat transfer with the saline water feed flowing therethrough. Condensate and non-condensible gas withdrawn from heat exchanger 114 are introduced into separator 142 to recover condensate therefrom. The condensate is withdrawn from separator 142 through line 143 and combined with the condensate in line 128, for cooling and passage to storage as hereinabove more fully described. The non-condensible gases are vented from the separator 142 through line 144.

Numerous modifications and variations of the invention are possible without departing from the scope thereof. Although the invention has been particularly described with reference to four flash stages in FIG. 1, this is not necessarily the optimum number of stages. Thus, as the number of flash stages increase, both the water recovery per pound of saline water feed and the heat economy improve because of an increase in the temperature of the feed preheat. However, as the number of flash stages increase the temperature difference between the flashed vapors and the saline water feed flowing through the heat exchangers, which function as both a condenser for the flashed vapors and as a heater for the feed, decreases and thus, heat exchangers of larger surface area must be employed. Hence, for any given set of conditions, the optimum number of flash stages may be readily calculated.

In another modification, successive flash systems of decreasing flash evaporation stages may be employed with the last flash system containing only one flash stage. The use of successive flash systems of decreasing stages increases potable water recovery per pound of saline water feed, but also increases the amount of solar heat required per pound of recovered water. Once again, for any given set of conditions the optimum number of flash systems of decreasing flash stages may be readily calculated.

In a further modification, a reservoir may be provided for hot saline water so that the systems illustrated in FIGS. 1 and 2 may operate around the clock. Referring to FIG. 3, there is shown by way of illustration a portion of the flash evaporation system of FIG. 1, provided with heat exchanger 15, solar heater 16, and flash evaporator 17 which function as described with reference to FIG. 1 and further provided with a storage pond 201 and a storage pond 202.

In operation, during the sunny hours, the solar heater 16 operates at full capacity to heat a full day water feed requirement for the evaporation system. Consequently, during the sunny hours, a portion of the water withdrawn from the solar heater 16 is accumulated in pond 202. The water withdrawn from heat exchanger 15, during the sunny hours, is introduced into pond 201 and water is passed from pond 201, through the solar heater 16 to the pond 202. During the dark hours, preheated water withdrawn from the heat exchanger 15 is accumulated in pond 201 and the heated water which was accumulated in pond 202 during the sunny hours is withdrawn therefrom and passed through the evaporation system. Accordingly, during both the sunny and dark hours, preheated water withdrawn from heat exchanger 15 is always introduced into pond 201 and heated water is always withdrawn from pond 202 and passed to the evaporation system enabling the system to operate continuously and at a constant rate.

The above modifications and numerous other modifications should be readily apparent to those skilled in the art from the teachings of the invention.

The following illustrates a specific embodiment of the invention, but the scope of the invention is not to be limited thereby:

EXAMPLE

In accordance with the embodiment illustrated in FIG. 1, 100 pounds of saline water at a temperature of 60° F. is passed successively through heat exchangers 11, 12, 13, 14 and 15 to raise the temperature of the saline water to 78° F., 96° F., 114° F., 132° F. and 136° F., respectively. The heated saline water is then passed through solar heater 16 wherein the temperature thereof is raised to 160° F. without change of phase.

The heated saline water is then successively passed through flash evaporators 17, 24, 31 and 42, operating at temperatures of 140° F., 120° F., 100° F. and 80° F., respectively, with two pounds of water vapor being flashed in each evaporator. The condensing heat exchangers and separators for each evaporator operate at the same temperature as their respective evaporator, and accordingly, vapor condensation is effected without cooling. Thus, condensation and separation is effected in separator 19 at 140° F., in separator 26 at 120° F., in separator 33 at 100° F., and separator 45 at 80° F.

The vapor withdrawn from separator 45 in the last flash evaporation stage is at a temperature of 80° F., and is compressed to one atmosphere in compressor 48. The water vapor in the compressed vapor is condensed and separated in separator 49 at a temperature of 140° F.

The condensate from separators 49, 19, 26 and 33 is flash cooled to 80° F. in flash evaporator 37 and combined with condensate withdrawn from the separator 45 at a temperature of 80° F. The total yield of condensate (potable water) is 8 pounds.

92 pounds of unvaporized saline water is withdrawn from the last flash evaporator 42 at a temperature of 80° F. and passed to the flash evaporation system illustrated in FIG. 2.

The 92 pounds of saline water at a temperature of 80° F. is passed successively through heat exchangers 111, 112, 113 and 114 to raise the temperature of the saline water feed to 98° F., 116° F., 134° F. and 136° F., respectively. The heated saline water is then passed through solar heater 115 wherein the temperature thereof is raised to 160° F. without change of phase.

The heated saline water is then successively passed through flash evaporators 116, 123 and 134, operating at temperatures of 140° F., 120° F., and 100° F., and 100° F., respectively, with 1.8 pounds of water vapor being flashed in each evaporator. The condensing heat exchangers and separators for each evaporator operate at the same temperature as their respective evaporator, and accordingly, vapor is condensed without cooling. Thus, condensation and separation is effected in separator 118 at 140° F., in separator 125 at 120° F., and separator 137 at 100° F.

The vapor withdrawn from separator 137 in the last flash evaporation stage, is at a temperature of 100° F. and is compressed to one atmosphere, in compressor 141. The water vapor in the compressed vapor is condensed and separated in separator 142, at a temperature of 140° F.

The condensate withdrawn from separators 142, 118 and 125 is flash cooled to 100° F. in flash evaporator 129 and combined with the condensate withdrawn from the separator 137 at a temperature of 100° F. The yield of condensate (potable water) is 5.4 pounds.

86.6 pounds of unvaporized saline water is withdrawn from flash evaporator 134 at a temperature of 100° F. and may be further treated in another flash evaporation system having two flash evaporation stages.

The process and apparatus of this invention are an improvement over those previously used for recovery of potable water from brines, and particularly those which employed solar energy as a source of heat. The solar heaters employed in accordance with the invention are considerably simpler and less expensive than those used in the humidification processes in that there is no necessity either for collecting troughs and the like or for specially designed translucent covers which permit a non-condensible carrier gas to flow over a pool of water. Moreover, in accordance with the invention, in a four-stage flash system only about three hundred B.t.u.'s/lb. of recovered water is required in contradistinction to the 1000 B.t.u./lb. required in the humidification processes. Although the heat requirement per pound of water increases when flash systems having a successively decreasing number of flash stage are employed, the heat requirement for such an operation, about 470 B.t.u.'s/lb., is still considerably less than the heat requirements for the humidification processes. In addition, the use of, for example, four successive flash systems having four, three, two and one flash stage results in a water recovery of 18.5 lbs. per pound of saline water as compared to 8 lbs./lb. feed for a single four-stage system.

Numerous modification and variations of the present invention are possible in light of the above teachings. It is therefore to be understood that within the scope of the appended claims the invention may be practiced otherwise than as particularly described.

What is claimed is:
1. In the evaporation of a liquid by solar radiation, the improved process comprising:
  (a) passing the liquid in series through a plurality of vapor condensation zones as hereinafter defined in step (d), to effect heating of the liquid to successively higher temperatures by indirect heat transfer with flashed vapors withdrawn respectively from a plurality of flash evaporators;
  (b) passing the resultant heated liquid through a heat exchanger zone as hereinafter defined in step (g) and then through a solar heating zone wherein the liquid is heated by solar radiation without effecting vaporization thereof;
  (c) passing at least a portion of the liquid from step (b) through the plurality of flash evaporators defined in step (a) comprising below atmospheric pressure flash evaporation zones of decreasing temperature and pressure to produce vapors which are withdrawn respectively therefrom;
  (d) passing the vapors from each flash evaporation zone through its respective condensation zone to indirectly heat the liquid feed as defined in step (a) and cool the vapor to condense distillate;
  (e) recovering the distillate from step (d);
  (f) combining non-condensed gas from each condensation zone with vapors from the subsequent flash evaporation zone for passage through its condensation zone to thereby effect recovery of additional distillate from the non-condensed gas; and
  (g) compressing the non-condensed gas from the last condensation zone and passing the compressed gas in an indirect heat transfer relationship with the liquid feed to the solar heating zone subsequent to the passing of the liquid feed through the condensing zones to effect recovery of additional distillate from said non-condensible gas.

2. The process as defined in claim 1 and further comprising:
  recovering condensate from the last flash evaporation zone and subjecting the saline water to steps (a), (b), (c), (d) and (e), using one less flash evaporation zone in step (c).

3. The process as defined in claim 1 wherein the condensate from each condensation zone is passed to a condensate flashing zone to effect flash cooling thereof and the vapors from said condensate flashing zone are combined with the vapors from the last flash evaporation zone.

4. The process as defined in claim 1 wherein the liquid is saline water.

5. An evaporation system for effecting evaporation of a liquid by solar radiation comprising:
  (a) a series of flash evaporators;
  (b) means for passing liquid from a first evaporator through each evaporator in the series;
  (c) a solar heater;
  (d) means to pass liquid from said solar heater to said first evaporator including means for storing liquid from the solar heater;
  (e) a condenser for each evaporator comprising means for passing said liquid in indirect heat exchange with vapors withdrawn from the evaporators;
  (f) means for passing vapor from each evaporator to each condenser respectively;
  (g) means for recovering condensate from each condenser;
  (h) means for passing feed liquid through each condenser in series;
  (i) means for storing preheated feed liquid after passing through the last of said condensers; and
  (j) means for passing the thus preheated stored liquid to said heater.

References Cited

UNITED STATES PATENTS

| | | | |
|---|---|---|---|
| 2,445,350 | 7/1948 | Ginnings | 202—172 |
| 3,119,752 | 1/1964 | Checkovich | 203—11 |
| 3,165,452 | 1/1965 | Williams | 203—11 |
| 3,168,450 | 2/1965 | Black | 203—10 X |
| 3,219,553 | 11/1965 | Hughes | 203—11 X |
| 3,320,137 | 5/1967 | Jebens et al. | 203—11 X |
| 3,248,307 | 4/1966 | Walford | 203—11 |
| 3,261,766 | 7/1966 | Sherwood | 203—11 |
| 3,305,456 | 2/1967 | Broughton | 203—100 X |
| 2,213,894 | 9/1940 | Barry. | |
| 2,490,659 | 12/1949 | Snyder | 202—205 X |
| 3,076,096 | 1/1963 | Bachmann | 202—234 X |
| 3,232,846 | 2/1966 | Kimmerle | 202—234 X |
| 3,257,290 | 6/1966 | Starmer | 203—11 X |

FOREIGN PATENTS 937,623  9/1963  Great Britain.

NORMAN YUDKOFF, Primary Examiner
F. E. DRUMMOND, Assistant Examiner

U.S. Cl. X.R.
202—173; 203—26, 88; 252—234